Nov. 22, 1927.
A. J. NORRIS
1,650,570
VENTILATOR FOR CLOSED VEHICLES
Filed Feb. 19, 1927     2 Sheets-Sheet 1
Fig. 1.
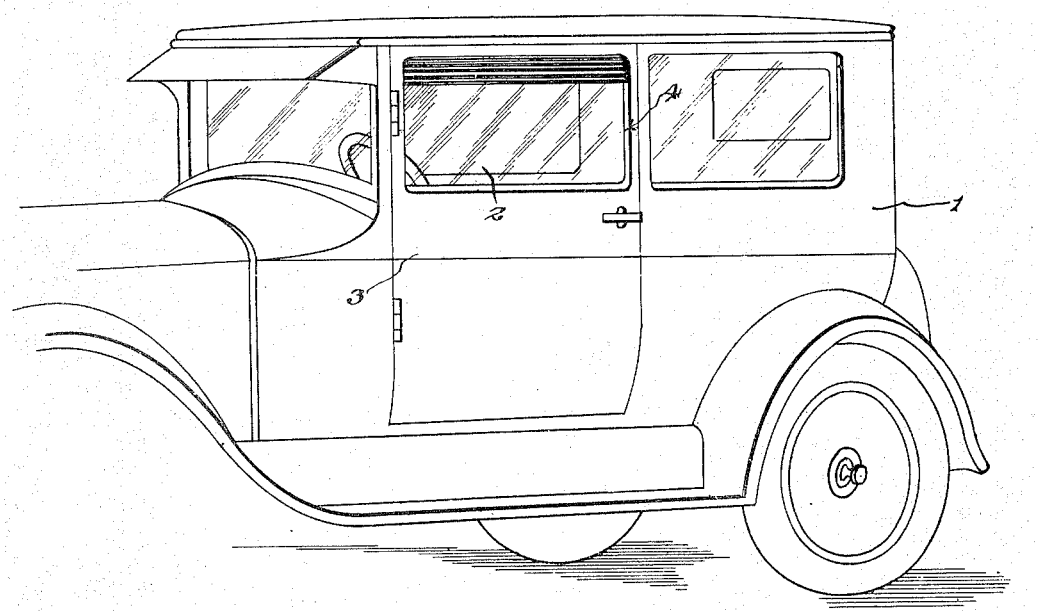
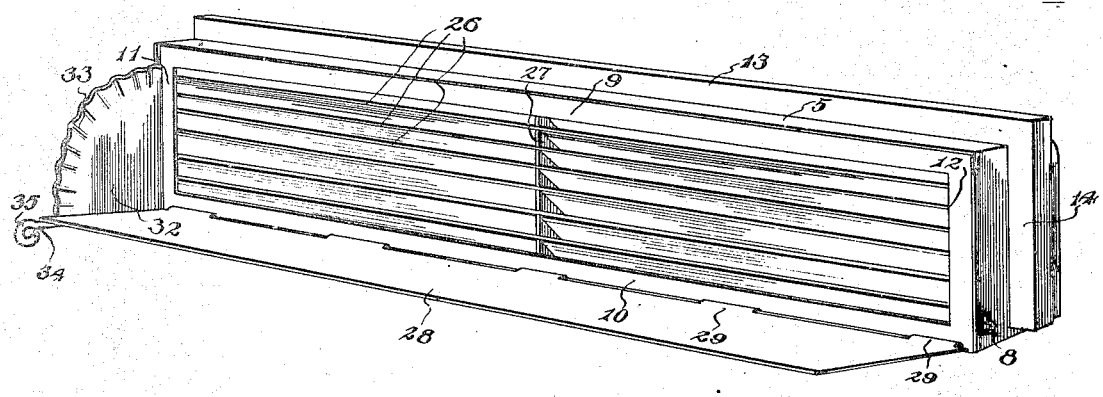
Fig. 2.
Inventor
A. J. Norris
By Lacey & Lacey, Attorneys Nov. 22, 1927.
A. J. NORRIS
1,650,570
VENTILATOR FOR CLOSED VEHICLES
Filed Feb. 19, 1927　　2 Sheets-Sheet 2
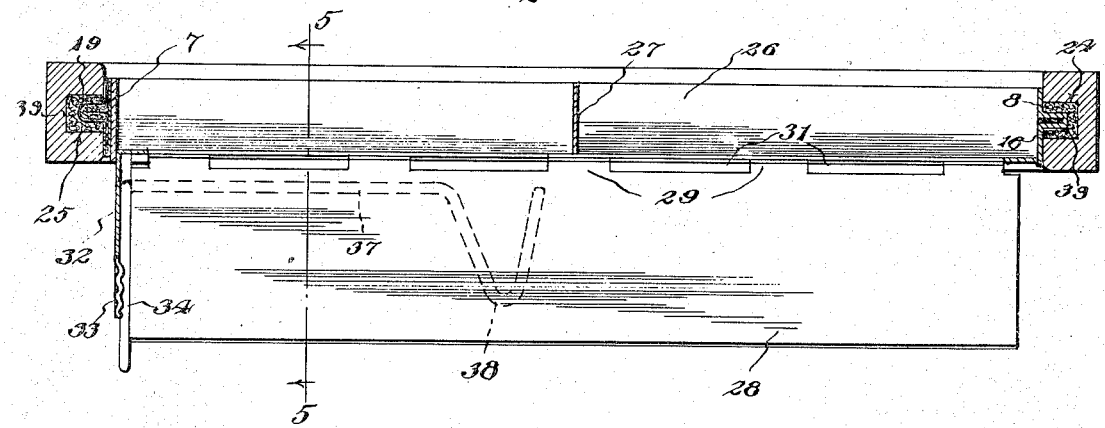
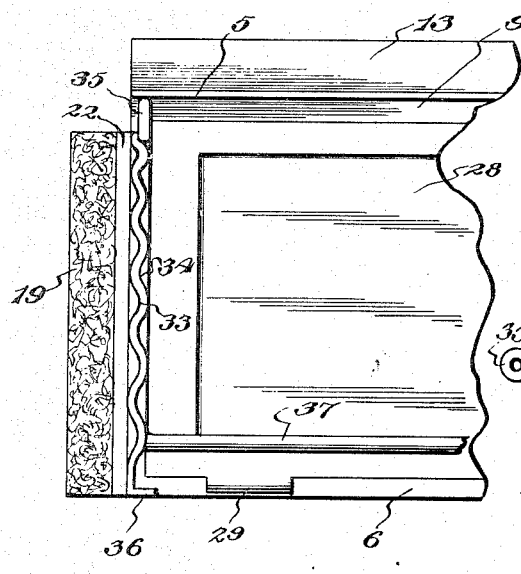
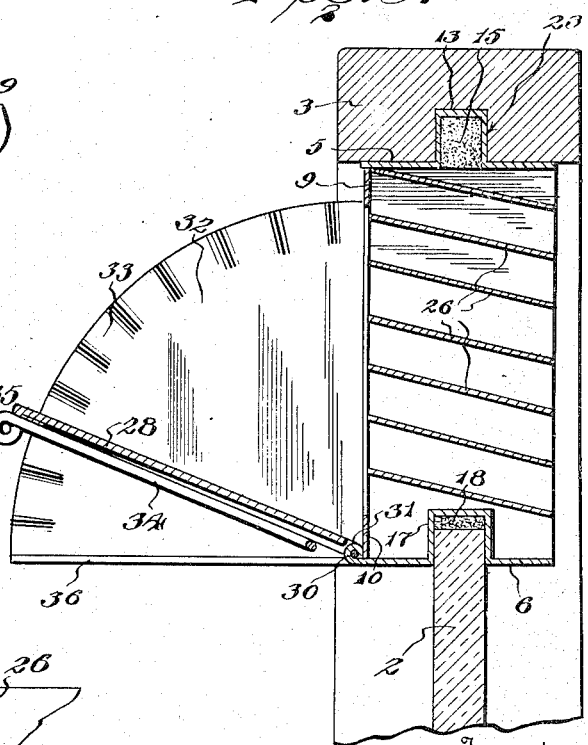
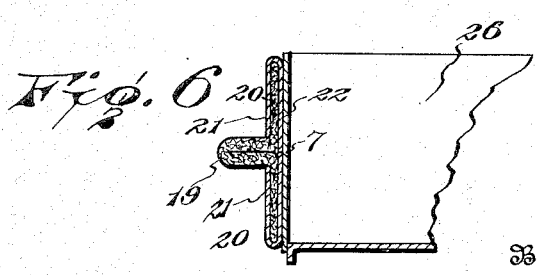
Inventor
A. J. Norris
By Lacey & Lacey, Attorneys Patented Nov. 22, 1927.

1,650,570

UNITED STATES PATENT OFFICE.

ANDREW J. NORRIS, OF REPUBLIC, MISSOURI; CORA A. NORRIS ADMINISTRATRIX OF SAID ANDREW J. NORRIS, DECEASED.

VENTILATOR FOR CLOSED VEHICLES.

Application filed February 19, 1927. Serial No. 169,531.

This invention relates to ventilators and more particularly to a ventilator adapted to be applied to a closed vehicle, such as a sedan or coupé, and very effectively cause air to be drawn out of the vehicle but at the same time prevent rain from entering the vehicle. When a vehicle of the closed type is in use and the windows are lowered during warm weather, dust is liable to be blown into the car or if a rainstorm is encountered when traveling the windows must be closed. It is, therefore, one object of the invention to provide a ventilator which may be set in place above a glass closure for a window and allow warm air or smoke to be drawn out of the vehicle by suction caused when the vehicle is in motion but at the same time very effectively prevent rain or dust from entering the vehicle. The device will also allow smoke to pass out if the occupants of a closed car are smoking and by preventing excessive heating of the car eliminate interior sweating or, in other words, the gathering of moisture upon the inner surfaces of the windows and windshield.

Another object of the invention is to permit the passage of warm air out of the vehicle to be controlled and, therefore, prevent too much warm air from being drawn out of the vehicle during cold weather.

Another object of the invention is to so construct the ventilator that it may be easily put in place or removed and securely held in place when installed.

The invention is illustrated in the accompanying drawings, wherein

Figure 1 is a perspective view showing the improved ventilator applied to a closed automobile of the sedan type;

Fig. 2 is a perspective view of the ventilator looking at the inner face thereof;

Fig. 3 is a longitudinal sectional view through the ventilator and showing the same in use;

Fig. 4 is an enlarged view showing one end portion of the ventilator in elevation and looking at the inner face thereof with the closure shut;

Fig. 5 is an enlarged transverse sectional view taken on the line 5—5 of Fig. 3, and Fig. 6 is a fragmentary sectional view taken horizontally through one end portion of the ventilator.

The ventilator forming the subject-matter of this invention is intended for use in connection with a closed automobile, such as the sedan shown in Fig. 1 and indicated in general by the numeral 1, and is intended to be installed above the glass 2 which is mounted in the door 3 and forms a closure for the window opening 4 of the door. It will be understood, however, that if the other windows shown are provided with movable closure glasses the ventilator could also be applied to these windows. The ventilator, when put in place, is located between the glass 2 and top of the window opening 4 and is firmly held in place by the glass, as shown in Fig. 3.

The ventilator is formed with an open frame having an upper wall 5, a lower wall 6 and end walls 7 and 8 which are preferably formed of sheet metal and at the inner end of the frame are provided with inwardly extending flanges 9, 10, 11 and 12. A longitudinally extending rib 13 is formed integral with the upper wall 5 and at one end of the frame joins a rib 14 formed integral with the end wall 8. These ribs 13 and 14 are filled with packing, as shown at 15 and 16, so that they will be strengthened and not liable to be dented or bent out of shape if the ventilator is carelessly handled. The packing may consist of rubber or a suitable composition which may be forced into the hollow ribs and completely fill the same, as shown in Figs. 3 and 5. The lower wall is also crimped similar to the upper wall, as shown in Fig. 5, but the rib formed upon the lower wall extends inwardly and defines a longitudinally extending pocket 17 adapted to receive the upper edge portion of the closure glass 2 when the ventilator is in use. A strip of felt or carpet is placed in the pocket 17 in order to provide a cushion 18 so that there will be no danger of the glass 2 being broken or chipped by contact with the metal walls of the pocket when the ventilator is installed. At the opposite end of the ventilator from the rib 14, there has been provided a rib 19 formed from a strip of carpet or the like which is folded to provide the rib, as shown in Fig. 6, and has its side portions extended away from each other to provide anchoring flaps 20 which fit beneath the flanges 21 of a securing clip 22 carried by the end wall 7 of the ventilator frame. By this arrangement the ventilator may be very easily put in place within the window opening 4 with the upper rod 13 fitting into the seat 23 at the top of the window opening into which the upper edge portion of the glass 2 is usually received and the ribs 14 and 19 fitting into the grooves 24 and 25 extending along opposite sides of the window opening and constituting guides or trackways for the closure glass. By referring to Figs. 3 and 5, it will be seen that, when in place, the ventilator will be securely mounted and prevented from accidentally working loose. In fact, the closure glass 2 of the window can be temporarily lowered if necessary without the ventilator dropping out of place. When, however, it is necessary to remove the ventilator, the closure glass of the window can be lowered and the ventilator easily drawn downwardly and then moved transversely out of the window opening.

Within the open frame, there has been provided baffle plates or strips 26 which extend longitudinally in the frame and have their ends soldered or otherwise secured to the end walls 7 and 8. These baffle plates or strips are braced intermediate the length of the frame by bracing strips 27 which may consist of a single plate notched to receive the strips 26 or may consist of separate strips extending between the strips 26 and soldered or otherwise secured thereto. By referring to Fig. 5, it will be seen that the baffle strips extend at a downward incline toward their outer side edges so that air and smoke can be readily drawn outwardly through the ventilator but rain and dust prevented from being blown through the ventilator into the automobile.

In order to control the passage of warm air out of the automobile, I have provided a closure plate or door 28 which covers the rear face of the ventilator when closed and along its lower edge is provided with hinge ears 29 through which passes a hinge pin 30 carried by hinge ears 31 disposed adjacent the bottom of the flange 10 in spaced relation to each other longitudinally thereof. A plate 32 projects from the open frame adjacent the end wall 7 thereof and is formed with an arcuate edge crimped to provide a rack 33 for engagement by a lever arm or handle 34 at the adjacent end of the closure door 28, the outer end of the lever arm being bent upon itself, as shown at 35, so that it may be easily grasped and the closure door swung toward or away from the open frame. It should be noted that the plate 32 consists of resilient sheet metal so that the rack 33 may have engagement with the lever arm and securely but releasably retain the closure door in a set position. The lower edge portion of the plate 32 is bent inwardly to provide an abutment flange 36 for engaging the lever arm and preventing the closure plate from being swung downwardly in an opening direction beyond the position shown in Fig. 2. The lever arm constitutes a portion of a metal rod 37 which extends longitudinally upon the adjacent end portion of the closure door and has its inner end portion bent to form an inverted U-shaped portion 38 which serves to assist in anchoring the wire strand to the door and also constitutes a brace to prevent the door from being bent out of shape. It will thus be seen that, when the ventilator is in place, the closure door may be very easily swung into or out of closing relation to the inner end of the open frame and may be securely held in a closed position or in a partially or entirely opened position.

When the ventilator is in use and is to be installed, the closure glass 2 of the doorway is moved downwardly a greater distance than the depth of the ventilator. The rib 14 is fitted into the closure receiving groove 24 at one side of the window opening with the ventilator extending at a downward incline toward its other end and the ventilator is then swung upwardly in the window opening so that the flexible or pliable rib 19 enters the groove 25 at the opposite side of the window opening. There is sufficient play between the ends of the ventilator and sides of the window frame to permit the necessary springing movement to accomplish insertion and removal of the ventilator. The ventilator is now pushed upwardly so that the rib 13 fits into the groove or recess 23 at the top of the window opening and the glass closure moved upwardly so that its upper edge portion fits into the groove or recess 17 in the lower wall of the ventilator. This will cause the ventilator to be firmly held in place and since there will be frictional binding between the ribs and the linings 38 of cushioning material for the grooves 24 and 25, the closure glass 2 may be temporarily lowered if necessary without the ventilator dropping out of place. After the ventilator has been installed, the closure door 28 is partially or entirely opened according to weather conditions and when the automobile is in motion a suction will be formed through the ventilator which will cause warm air or smoke in the automobile to be drawn outwardly. When no longer needed, the ventilator can be very easily removed and put away.

Having thus described the invention, I claim:

1. A vehicle ventilator adapted to fit into a window frame above a vertically sliding closure and provided at one end with a rigid anchoring rib and at its other end with a pliable anchoring rib, said ribs being adapted to fit into closure-receiving grooves extending along the sides of the window frame and constituting the sole retaining means for the ends of the ventilator.

2. A vehicle ventilator adapted to fit into a window frame above a vertically sliding closure, said ventilator comprising an open frame, a rigid anchoring rib extending from one end of said open frame, a pliable anchoring rib extending from the other end of said open frame, said ribs being adapted to fit into closure-receiving grooves extending along the sides of the window frame and constituting the sole retaining means for the ends of the ventilator, and baffle plates in said open frame extending at a downward incline towards their outer edges.

3. A vehicle ventilator adapted to fit into a window frame above a vertically sliding closure, said ventilator comprising an open frame, a rigid anchoring rib extending from one end of said open frame, securing flanges extending along the other end wall and having free side portions facing each other, a strip of pliable material folded longitudinally to provide a flexible rib extending between the facing sides of said flanges and side portions fitting beneath the flanges and secured thereby, and baffle plates in said open frame.

4. A vehicle ventilator comprising an open frame adapted to fit into a window frame above a closure movable vertically therein, rigid anchoring ribs extending along and projecting from the upper edge face and one end face of said open frame to fit into closure-receiving grooves extending along the top and one side of the window frame, a pliable rib extending along and projecting from the other end face of said open frame to fit into a closure-receiving groove at the other side of the window frame and constituting the sole retaining means for the last mentioned end of the ventilator, and baffle plates extending longitudinally in said open frame and extending at a downward incline towards their outer edges.

5. A vehicle ventilator adapted to fit into a window frame above a closure, said ventilator comprising an open frame having upper, lower and end walls, the lower wall being formed with a longitudinally extending groove opening through its under face and the upper wall and one end wall having longitudinally extending ribs formed integral therewith and projecting outwardly therefrom to fit into closure-receiving grooves formed across the top and along one side of a window frame, a rib of pliable material anchored to and extending from the outer face of the other end wall of said frame and adapted to fit into a closure-receiving groove at the other side of the window frame and constituting the sole retaining means for the last mentioned end of the ventilator, and baffle plates extending longitudinally in said open frame.

6. A vehicle ventilator adapted to fit into a window frame above a vertically sliding closure, said ventilator comprising an open frame having upper, lower and end walls, baffle plates in said frame, a rack extending from one end wall rearwardly of the open frame, a closure for the open frame hinged to the frame at the rear thereof, and a rod extending longitudinally upon said closure and having its inner end portion bent to form a bracing arm and its outer end bent to form an actuating handle engaging said rack and adapted to hold the closure in a set position.

In testimony whereof I affix my signature.

ANDREW J. NORRIS. [L. S.]